Aug. 12, 1969  D. R. McCLINTOCK  3,460,237
METHOD OF MAKING A NUCLEAR FUEL ELEMENT
Original Filed April 26, 1963

INVENTOR
Donald R. McClintock
BY
ATTORNEY

United States Patent Office 3,460,237
Patented Aug. 12, 1969

3,460,237
METHOD OF MAKING A NUCLEAR FUEL ELEMENT
Donald R. McClintock, Irwin, Pa., assignor to Westinghouse Electric Corporation, Pittsburgh, Pa., a corporation of Pennsylvania
Continuation of application Ser. No. 275,884, Apr. 26, 1963. This application Dec. 20, 1966, Ser. No. 603,389
Int. Cl. B23k 9/00
U.S. Cl. 29—474.3                           3 Claims

ABSTRACT OF THE DISCLOSURE

A method is disclosed of joining a plug, having a land, to tubular cladding for nuclear fuel. The tubular cladding is very thin, about .010 inch, and may be composed of stainless steel. The joining is effected by fusion tungsten-arc welding with the welding arc impinging at the junction of the land and outer extension of the plug.

---

This application is a continuation of my copending application, Ser. No. 275,884, filed Apr. 26, 1963 for Nuclear Fuel Element and Method of Making Such Element, now abandoned.

This invention relates to the nuclear art and has particular relationship to fuel elements for nuclear reactors which serve to generate power. Specifically this invention concerns itself with fuel elements in which a fissile material is in a sealed enclosure that serves as cladding. An assembly or stack of such elements is immersed in a heat-exchange or cooling liquid which typically may be water at 600° or 700° Fahrenheit and 2000 pounds per square inch pressure. This liquid is highly corrosive and the cladding must be corrosion-resistant to protect the fissile material from the liquid.

The development of heat useful for power purposes in a reactor of the type just described depends on the flow of neutrons through the fissile material. Neutrons emitted by the fissile material of one element may pass through the heat-exchange liquid into another element. The flow of neutrons may be materially reduced by the parasitic capture of the neutrons by the cladding. The extent to which cladding material reduces the neutron flow is measured by the neutron-capture cross-section of the material. To reduce the parasitic capture it is desirable that the cladding material should have a low neutron cross-section. The cladding must then not only be resistant to corrosion by the heat-exchange liquid but it also must have a low neutron-capture cross-section. Zirconium and stainless steel are two materials which meet these conditions. The zirconium has a very low neutron-capture cross-section but is highly costly and presents difficulties in fabrication. Stainless steel is less costly but has a substantially higher neutron-capture cross-section than zirconium.

An objective in nuclear-reactor development and design is to minimize the cost per kilowatt hour of the power supplied. This cost may be substantially reduced by reducing the parasitic capture of neutrons by the cladding. It is then broadly an object of this invention to minimize the cost of power produced by a reactor by substantially reducing the parasitic capture of neutrons in the operation of a reactor. Because of the cost and the other problems which zirconium presents, stainless steel is a preferred cladding material and it is a specific object of this invention to provide a fuel element in which the cladding is stainless steel and in the use of which the parasitic capture of neutrons shall be minimized.

In accordance with this invention in its specific aspects, a fuel element is provided in which the fissile material is clad in stainless steel and in which the parasitic capture of neutrons is materially reduced by materially reducing the thickness of the cladding. In a typical fuel element in accordance with the teachings of the prior art, the thickness of stainless steel cladding substantially exceeds 10 mils, that is, .010 inch; the thinnest cladding which has been used on a pressurized water reactor was 15 mils. The parasitic capture of neutrons by the cladding can be reduced by materially reducing the thickness of the cladding to less than 10 mils. It has been found that a decrease of 1 mil in the thickness of the stainless steel cladding of the fuel elements of a typical reactor would result in an annual saving in power cost of approximately $75,000.

The use of cladding of stainless steel having a thickness of less than 10 mils presents the problem of sealing the cladding. In a typical fuel element the fissile material is in a tubular shell which is sealed by a plug. The plug usually has a land between a part extending into the shell and a part extending out of the shell. The shell is sealed by arc welding with a nonconsumable electrode. In accordance with the teachings of the prior art the sealing is effected by moving a welding arc around the joint of the plug and shell with the electrode generally perpendicular to the axis of the shell and adjacent the joint of the land on the plug and the edge of the shell engaging the plug.

Attempts to seal the plug to cladding having a thickness of less than 10 mils in this way has proved unsuccessful. Instead of becoming fused into a joint the thin cladding curls over and is burned without melting under the heat of the arc. Attempts to overcome this difficulty by welding with a low-current arc has also proved unsuccessful. It has been found that when the arc current is reduced to a low magnitude, for example of the order of 15 amperes, the arc becomes too unstable to serve for welding. It is then a specific object of this invention to provide a method of welding a plug into thin walled cladding having a thickness of less than 10 mils.

In accordance with this aspect of the invention, the plug is sealed to the cladding by arc welding in the region of the joint between the outer extension and the land of the plug remotely from the rim of the cladding which is to be joined and which engages the land. Specifically, a non-consumable welding electrode is disposed in welding relationship with this region, an arc is fired, and the electrode is moved around the region of the junction and moving the arc as it moves. The arc current is sufficient to fuse the land and the portion of the cladding in engagement with the land. A pressure tight bond is thus provided between the plug and the cladding.

While this invention in its important specific aspects is particularly applicable to fuel elements having cladding of very thin stainless steel, this invention, in its broader aspects, is also applicable to fuel elements in which the cladding is of another material such as zirconium. While the neutron-capture cross-section of zirconium is very low, the decrease of the thickness of the cladding would reduce the parasitic capture of neutrons in the case of zirconium and would render the operation more efficient.

The novel features considered characteristic of this invention are disclosed generally above. For a better understanding of this invention both as to its organization and as to its method of operation, together with additional objects and advantages thereof, reference is made to the following description taken in connection with the accompanying drawing in which.

Figure 1:
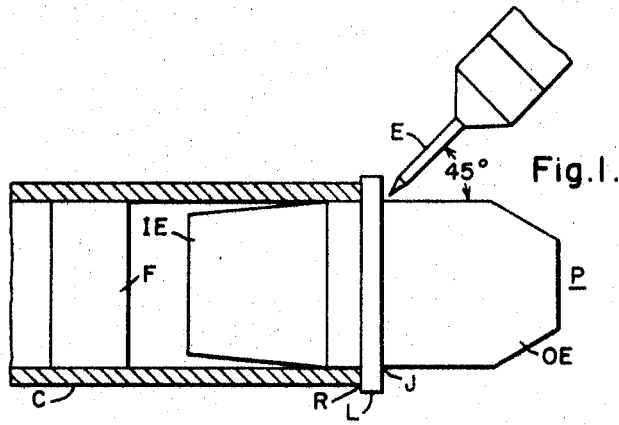
FIGURE 1 is a view in section showing the relationship of the electrode and the fuel element in welding in accordance with this invention.

FIG. 1 shows a portion of a fuel element prior to a welding operation. This fuel element includes a generally cylindrical shell C of stainless steel within which a plurality of pellets F of fissile material are enclosed. The shell C is closed by a plug P having an outer extension OE, an inner extension IE, and a land L. The thickness of the shell C is less than 10 mils.

It is necessary to seal the plug P to the shell by a metallurgical bond. This object is accomplished by welding the land L to the rim R of the shell C. So that the welding may be carried out effectively a non-consumable welding electrode E is disposed in welding relationship with the region of the junction J of the outer extension OE and the land L, an arc is fired between the electrode E and the region of the junction J, and the arc is moved around the junction J to produce the seal. Specifically, the electrode E may be disposed and move around junction J at an angle of 45° to the plane of the land.

Figure 2:
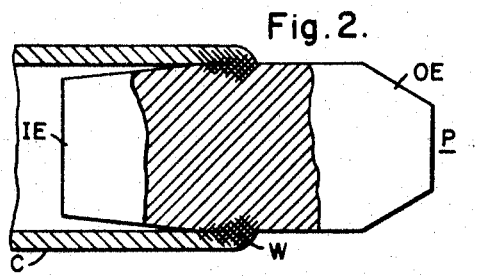
FIG. 2 is a view in section of a welded fuel element.

The arc current is adequate to fuse the land L and the tip of the shell C producing a fusion weld W (FIG. 2) of the land and the tip. A welded element is shown in FIG. 2 in which the weld W is seen to encompass the land and a portion of the tip.

Figure 3:
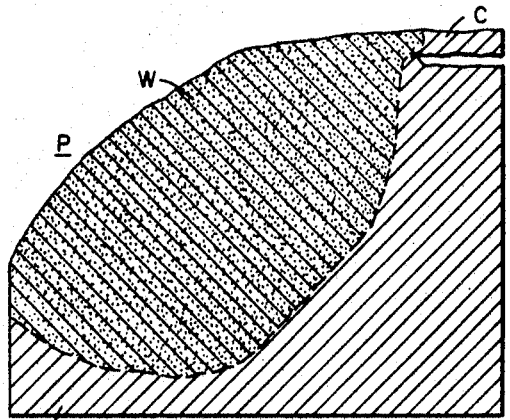
FIGS. 3, 4 and 5 are photomicrographs showing welds of plugs to the cladding of fuel elements in accordance with this invention.
Figure 4:
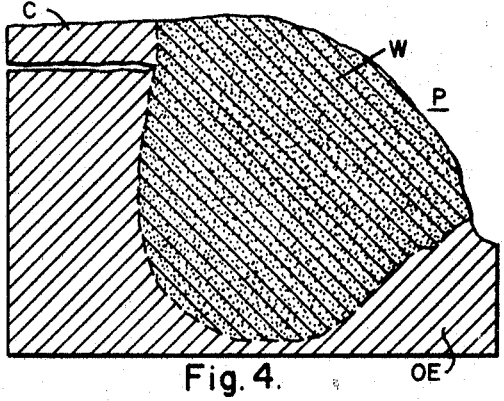
Figure 5:
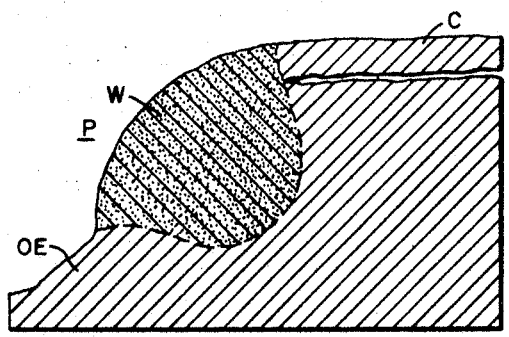

FIGS. 3, 4 and 5 are photomicrographs of welds made in the practice of this invention of a plug P to a shell C. Each of these welds was made with a plug in the shell, both the plug P and the shell C are in each case of AISI 304 stainless steel. In FIG. 3, the shell C has a thickness of 5 mils and in FIGS. 4 and 5, the shell has a thickness of 8 mils. In making the weld of FIG. 3, the welding current was 28 amperes; for FIG. 4, the current was 24 amperes, and for FIG. 5, 16 amperes. The photomicrographs show that the quality of the weld was not affected by the current. The different currents produced only a difference in penetration into the plug P. The deepest penetration is in the weld shown in FIG. 3, the penetration of the weld in FIG. 4 less and that of the weld in FIG. 5 still less. The variation of the current does not affect the soundness of the joint between the shell C and the plug. Each seal, as shown by the photomicrographs, is entirely sound.

Tests of fuel elements made in the practice of this invention in high temperature, high pressure water have revealed that the thin shell is capable of withstanding the pressure and temperature.

The method of welding in accordance with this invention has resulted in a number of advantages. The fuel element with very thin cladding has become a reality. The end plugs can be readily joined to the thin cladding. The sealed joints can be consistently reproduced and all joints are pressure and fluid resistant. The variations in welding current and voltage which appears to be characteristic of the tungsten inert-gas welding process do not appear to effect the joint. Regardless of these variations, a sound seal is produced. The plug with the land lends itself readily to economical fabrication. The joint produced is readily inspected by X-rays.

While an embodiment of this invention has been disclosed herein, many modifications thereof are feasible. This invention is not to be restricted except insofar as is necessitated by the spirit of the prior art.

I claim as my invention:

1. The method of metallurgically sealing a plug to cladding having a thickness of less than 10 mils, said plug having an outer extension connected to a land, said land engaging the rim of said cladding in its side opposite said outer extension, the said land having an inner periphery forming a junction with said outer extension and an outer periphery, the said method comprising setting a non-consumable electrode in welding relationship generally with said junction of said extension and said inner periphery of said land, firing a welding arc between said electrode and the general region of said junction, and moving said electrode around said junction to move said arc around said junction, the current of said arc being adequate to fusion weld said land and the adjoining rim of said cladding to produce a seal, the weld encompassing said land and the rim of said cladding engaged by said land.

2. The method of metallurgically sealing a plug to cladding having a thickness of less than 10 mils, said plug having an outer extension connected to a land engaging the rim of said cladding on its side opposite said outer extension, the said method comprising setting a nonconsumable electron in arc welding relationship generally with the region of said extension and land remote from said cladding, firing a welding arc between said electrode and said region, and moving said electrode around said extension while maintaining said arc in said region, the current of said arc being adequate to fusion weld said land and the adjoining rim of said cladding to produce a seal, the weld encompassing said land and the rim of said cladding engaged by said land, the electrode being so set that the arc impinges on a junction of said outer extension and land from which the heat of said arc flows in part radially outwardly along said land and through said land to said cladding.

3. The method of claim 2 wherein the electrode is positioned with its tip in welding relationship with the junction and its axis at angles of 45° to the adjacent wall of the extension.

References Cited

UNITED STATES PATENTS 3,100,742  8/1963  McGeary et al. __ 29—474.3 X
3,183,066  5/1965  Lessman et al. ____ 29—482 X JOHN F. CAMPBELL, Primary Examiner J. L. CLINE, Assistant Examiner U.S. Cl. X.R.

29—482, 486